United States Patent [19]

Starck et al.

[11] 4,035,837
[45] July 12, 1977

[54] PROCESS AND ARRANGEMENT FOR FACSIMILE CODING

[75] Inventors: Alexander Starck, Munich; Wolfgang Postl, Hoehenrain, both of Germany

[73] Assignee: Siemens Aktiengesellschaft, Berlin & Munich, Germany

[21] Appl. No.: 624,717

[22] Filed: Oct. 22, 1975

[30] Foreign Application Priority Data

Dec. 9, 1974 Germany .......................... 2458118

[51] Int. Cl.² .......................................... H04N 1/46
[52] U.S. Cl. .................................. 358/78; 358/261
[58] Field of Search ................ 358/78; 178/DIG. 3, 178/6, 69.5 R

[56] References Cited

U.S. PATENT DOCUMENTS

| 3,873,920 | 3/1975 | Apple, Jr. et al. | 178/69.5 R X |
| 3,935,379 | 1/1976 | Thornburg et al. | 178/DIG. 3 |
| 3,941,922 | 3/1976 | Tsuchiya et al. | 178/DIG. 3 |

*Primary Examiner*—Richard Murray
*Assistant Examiner*—Mitchell Saffian
*Attorney, Agent, or Firm*—Hill, Gross, Simpson, Van Santen, Steadman, Chiara & Simpson

[57] ABSTRACT

A process for facsimile coding in which the items of information contained on a two-color original are scanned line-by-line for the purpose of transmission, in which the length of sequences of a first of these colors is represented by first code words consisting of a given first number of binary characters, and the lengths of sequences of the second color are represented by second code words consisting of a second number of binary characters, and in which the first and second code words are followed by third code words when the binary characters are not sufficient for coding the corresponding sequences, provides that the number of binary characters in the third code words is equal to the sum of the number of binary characters of the first code words and the number of the binary characters of the second code words. In a transmitter a coder is provided for the production of the code words, and in a receiver a decoder is provided for decoding the code words. A code word generator is provided in the coder and contains a counter which serves to establish the sequence length of the sequences to be coded and contains a shift register into which the contents of the counter are transferred at stipulated times, in each case after a number of emitted binary characters which is equal to the number of binary characters in the particular transmitted code words and from which the code words are emitted to a transmission unit. A code word decoder is provided in the decoder and contains first and second registers into which the first and second code words are input. The first and second code words being assigned to the sequences with the first and second color respectively, a third register into which the third code words are input, and a transfer switch by way of which the code words are read-out from the first, second or third registers.

14 Claims, 12 Drawing Figures

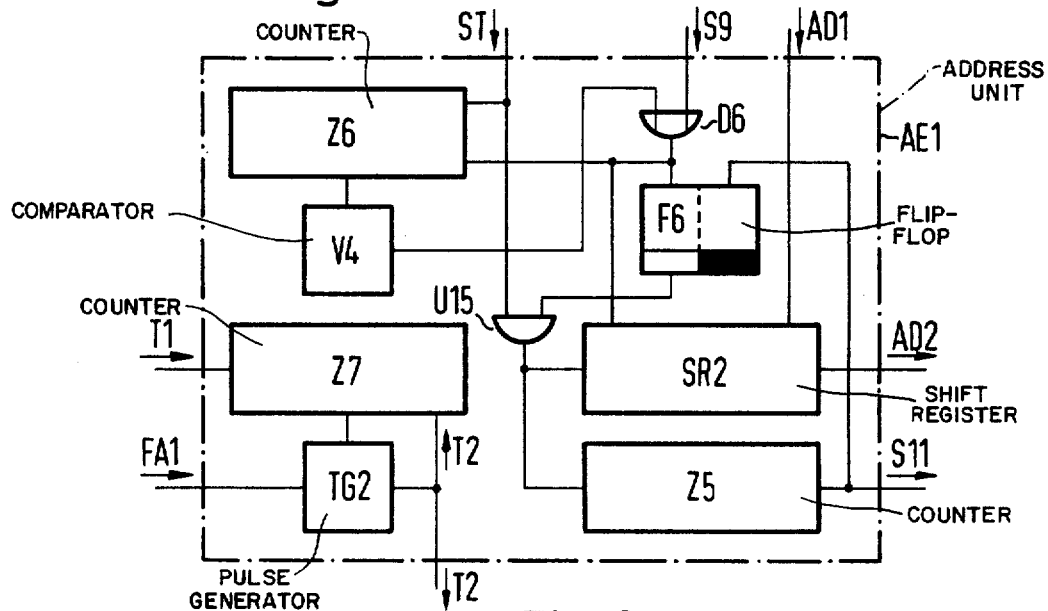
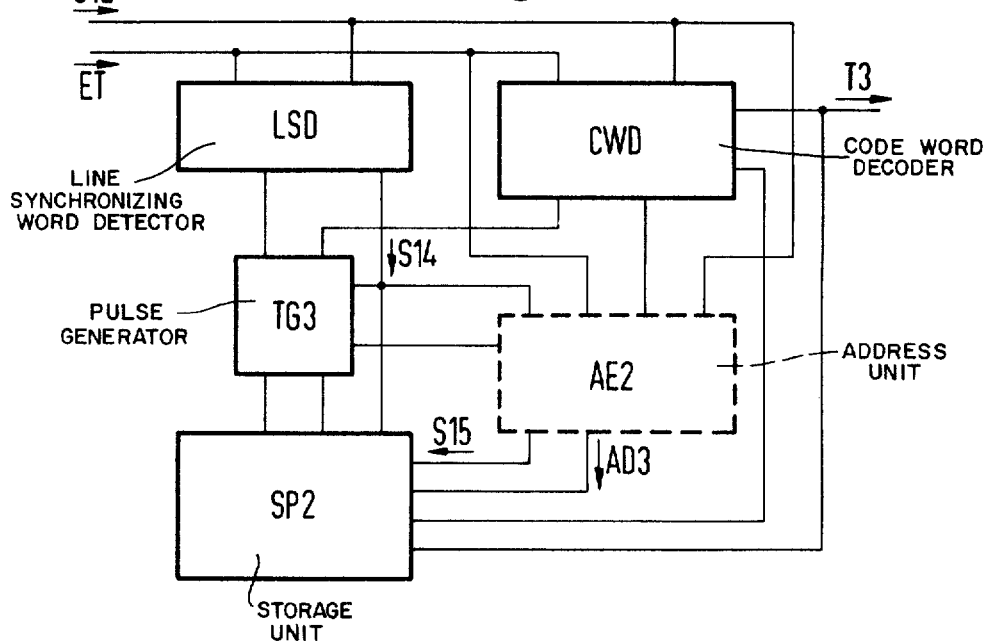

PROCESS AND ARRANGEMENT FOR FACSIMILE CODING

CROSS REFERENCE TO RELATED APPLICATION

This application is related to our U.S. patent application, Ser. No. 624,660 filed Oct. 22, 1975, and assigned to the same assignee as the present invention.

BACKGROUND OF THE INVENTION

1. Field of the Invention

The invention relates to a process and apparatus for facsimile coding in which items of information contained on a two-color original are scanned line-by-line for the purpose of transmission, in which the length of the sequences of a first of these colors is represented by first code words consisting of a given first number of binary characters and the length of sequences of a second color is represented by second code words consisting of a second number of binary characters, and in which the first and second code words are followed by at least one third code word when the binary characters are not sufficient for the coding of the corresponding sequences.

2. Description of the Prior Art

The publication by D. Preuss: Redundanz-reduzierende Codierung von Faksimilesignalen, Nichrichtetechnische Zeitschrift (Redundancyreducing Coding of Facsimile Signals, Communications Technological Magazine), Vol. 11 (1971) Pages 564 to 568 discloses a process for coding the lengths of sequences of a first color and a second color in facsimile transmission, this process being referred to as sequence length coding. In this process the lines which are to be scanned are broken down into portions of like colors, of equal brightness, which are referred to as sequences. For each sequence, a code word is produced, which code word indicates the relevant number of image points, and which is referred to as sequence length, in the form of a dual number. If a code word is not adequate to represent a sequence length, it is supplemented by additional code words of equal length.

If a code word produced by this known process is transmitted in faulty fashion, the associated sequence length is incorrectly reproduced in the receiver and the entire following image content is displaced. A faulty transmission has particularly disadvantageous effects when a code word is supplemented by an additional code word in order to represent a long sequence, but this additional code word is not recognized. In this case the receiver can no longer correctly assign the received code words the sequence lengths for the first color or the second color, since it is no longer able to recognize which characters form a code word. If, however, a line synchronizing word is provided at the beginning of each line, the effects of a fault can be limited to one line.

SUMMARY OF THE INVENTION

The object of the invention is to provide a process for facsimile coding in which the assignment of the code words to the sequence lengths is effected with low fault liability.

According to the invention, the above object is realized in a process of the type described in the foregoing in that the number of binary characters of the third code words is equal to the sum of the number of binary characters of the first code words and the number of binary characters of the second code words.

The process, in accordance with the invention, possesses the advantage that the received code words can be pulsed in a simple fashion, since the code words for the sequences of the first color can begin only at precisely stipulated times. Also, when the third code words are added to the first and second code words when the latters' length is not sufficient to represent a sequence length, it is ensured that these third code words can begin and end only at precisely stipulated times.

If a sequence of code word occurs which has binary characters which are identical to the successions of binary characters in the line synchronizing word, the line synchronizing word is recognized as such only when the succession of binary characters begins at the correct pulse train time. For this purpose, it is advantageous for the number of binary characters in the line synchronizing word to amount to a whole-numbered multiple of the sum of the first number and the second number. If the first number is greater than the second number, it is expedient to use the color of the background of the original as a first color and the color of the recorded information as a second color.

Since the texts which are to be transmitted often feature a black script on a white background, it is advantageous for the first color to be white and the second color to be black, although, of course, other color combinations may be used.

An increase is achieved in the compression factor if, in the case of the coding of lines which consist only of one sequence of the first color, the line synchronizing word only is produced.

In order to ensure that the code words for the sequences of the first color begin only at the pulse train times, it is advantageous that, at the beginning of each line a simulated spot of the first color, and at the end of the line a simulated spot of the second color, should be additionally coded and transmitted, but not reproduced.

It is possible to prevent the propagation of the effects of transmission faults over larger sections of the reproduced original if, in each case, after a given number of binary characters which is equal to a whole-numbered multiple of the sum of the first and the second number, an address word is transmitted which corresponds to the address of the next sequence.

It is possible to dispense with coding the sequences of the first color following the insertion of an address word if the address word indicates the address of the particular next sequence of the second color. Similarly, the coding of the particular first sequence of the first color in a line is dispensed with if the address of the first sequence of the second color is transmitted after each line synchronizing word.

In order to safeguard the pulsability of the code words, even when the address words are gated in, it is advantageous for the number of binary characters of the address words to be equal to the sum of the first number and a whole-numbered multiple of the sum of the first number and the second number.

The compression factor is generally increased, in spite of the gating in of the addresses, if, following the particular last sequence of the second color of a line, the particular next line synchronizing word is transmitted.

An advantageous construction of an arrangement for the execution of the process, in which a coder serving to produce the code words is arranged in a transmitter, and a decoder serving to decode the code words is arranged in a receiver, is attained by a code word generator, which is provided in the coder and which contains a counter serving to establish the sequence length of the sequences which are to be coded, and also contains a first shift register into which the contents of the counter is transferred at given times in each case following a number of emitted binary characters which is equal to the first number or second number of third number of binary characters, and from which the code words are fed to a transmission device, and is further attained by a code word decoder which is arranged in the decoder and which contains a first register stage and second register stage into which are input the first and second code words, respectively, assigned to the sequences of the first color and the second color, respectively, and which contains a third register stage into which the third code words are input, and which contains a transfer switch by way of which the code words are selectively read-out from the first, second or third register stage.

An advantageous construction of the code word generator is achieved if, in the code word generator, there are arranged a further counter, which counts off the binary characters of the code words under the control of a transmitting pulse train, and also a first comparator and a second comparator, each of which emits a signal which transfers the contents of the counter into the first shift register when a number of binary characters assigned to the particular transmitted code word has been emitted.

An advantageous construction of the register stages is achieved if each register stage contains a first shift register in which the code words are stored, and also contains a second shift register in which control signals are stored and at the output of which a first binary value is emitted when the corresponding code word is stored in full in the first shift register.

BRIEF DESCRIPTION OF THE DRAWINGS

Other objects, features and advantages of the invention its organization, construction and operation will be best understood from the following description, taken in conjunction with the accompanying drawings, on which:

FIG. 8 is a circuit diagram of a first address unit;

FIG. 9 is a block circuit diagram of a decoder;

DESCRIPTION OF THE PREFERRED EMBODIMENTS

Figure 1:
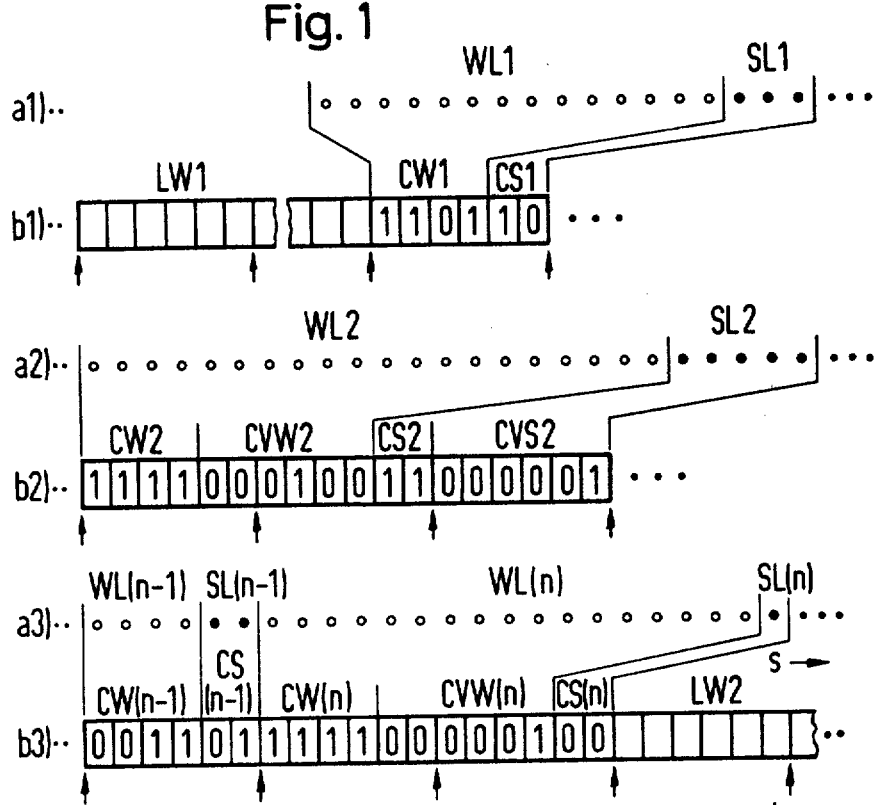
FIG. 1 schematically illustrates a line which is to be scanned and code words assigned to the various sequences.

The line, represented in FIG. 1 in rows $a1$ to $a3$, of a two-color original which is scanned line-by-line by a scanning unit is compoed of surface elements of a first color and a second color, for example black and white surface elements. The path $s$ traveled along during scanning is represented in the horizontal direction. The surface elements alternately form white sequences WL and black sequences SL, having lengths which are indicated by the numbers of white and black surface elements, respectively, and which are referred to as sequence lengths. The sequence lengths are represented by first and second code words CW and CS each of which consist of a given number of binary characters. The code words CW for the sequence lengths of the white sequences WL are formed from a first number AW of binary characters and the code words CS for the black sequences SL are formed from a second number AS of binary characters. For example, the code words CW contain AW = 4 binary characters, and the code words CS contain AS = 2 binary characters. If the code words CW and CS are not sufficient to code the sequence lengths, third code words CVW or CVS are added, having a number AV of binary characters which is equal to the number of the numbers AW and AS. In the coding, the sequence lengths which are reduced by one surface element are represented in the form of dual numbers by the code words.

The rows $b1$ to $b3$ illustrate an example of a succession of code words CW, CS, CVW and CVS such as are formed in the coding of the line represented in the rows $a1$ to $a3$. The time $t$ is represented in the horizontal direction. At the beginning of each line the code words are preceded by a line synchronizing word LW1 which forms a receiver that a new line is commencing.

The first white sequence WL1 in row $a1$ has a sequence length of 14 surface elements. Since the code word CW1 indicates the sequence length, reduced by one surface element, in the form of a dual number, the code word CW1 contains the dual number 1101. Similarly the first black sequence SL1 with a sequence length of three surface elements is represented by the dual number 10 as the code word CS1. The next white sequence WL2 has a sequence length of 20 surface element. However, only 16 surface elements can be represented with the four binary characters of the code word CW. In this case the number $2^{AW}-1$ which consists purely of binary character 1's is represented in the form of a dual number as code word CW2. Then a code word CVW2 is formed which represents the sequence length reduced by 16. In the represented example the code word CVW2 contains the dual number 000100.

Next, the code word CS2 for the next black sequence SL1 formed which has a sequence length of five surface elements. The code word CS2 is also not sufficient to represent the total black sequence SL2. In this case, similarly as with the white sequence WL2, the number $2^{AS}-1$ is represented in the form of a dual number as code word CS2, and then the sequence length, reduced by four, is represented by a code word CVS2. If the code words CVW and CVS are still insufficient for the representation of the corresponding sequence lengths, the latter are formed purely from the binary character 1 and the code words are adjoined by additional code words CVW and CVS.

The remaining sequences WL $(n-1)$ to SL $(n)$ of the line care coded in a similar fashion. In order to ensure that the first sequence of a line is always white and the last sequence is always black, a white spot is placed at the beginning of the line to be transmitted and a black spot is placed at its end and is additionally transmitted but not reproduced. After the black spot, the line synchronizing word LW2 of the next line is formed. If this line consists only of one white sequence — apart from the simulated black spot at the end of the line — the next line synchronizing word is formed immediately thereafter.

By selecting the number AV as the sum of the numbers AW and AS it is ensured that the code words CW and CS can begin only at precisely stipulated times. The code words CW can begin only at the pulse train time characterized by arrows in FIG. 1, and the code words CS can end only at these pulse train times. These pulse train times facilitate the clear recognition of white and black sequences after transmision faults, and the pulsing of the code words.

For the pulsing of the code words it is also expedient to provide that the line synchronizing word LW also begins and ends only at precisely stipulated times, for example at the pulse train times. This is achieved in a simple way in that the length of the line synchronizing word is selected to be such that it is equal to a whole numbered multiple of the sum of the numbers AW and AS.

In this case it is not necessary to check every received binary character to establish whether it is a binary character of the code words or of the line synchronizing word. A sequence of code words having binary characters which correspond by chance to the line synchronizing word can thus only be considered as line synchronizing words when they begin by chance at the pulse train time with the correct sequence. In this way the probability of the faulty recognition of line synchronizing words is reduced.

Figure 2:
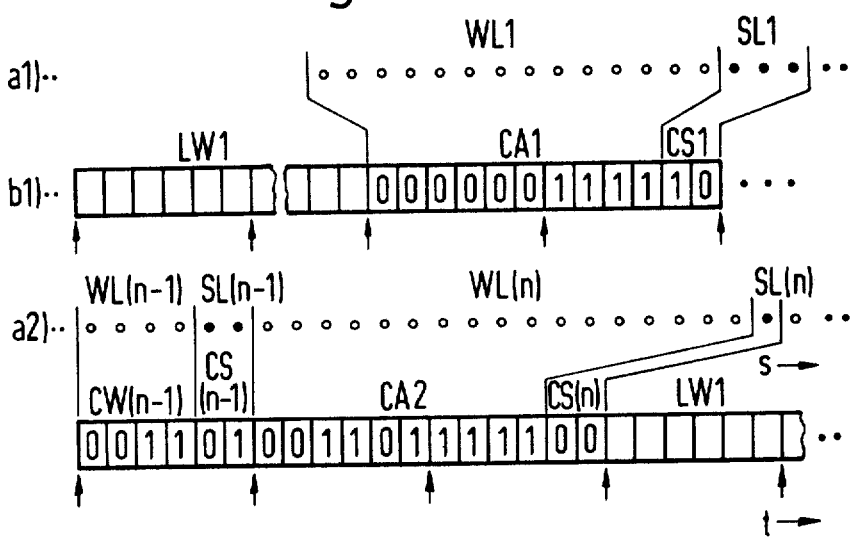
FIG. 2 schematically illustrates a line and the assigned code words when address words are gated in between the code words.

In the rows $a1$ and $a2$, FIG. 2 shows the lines corresponding to the rows $a1$ and $a3$ in FIG. 1, and in the rows $b1$ and $b2$ FIG. 2 shows associated code words. Similarly as in FIG. 1, a line synchronizing word LW1 is arranged preceding the code words. In addition to the code words, after a given number of binary characters, address words are, in each case, inserted in order, in the case of a transmission fault in order to limit the effects of the fault merely to a small part of the reproduced original.

Directly after the line synchronizing word LW1, the address of the first black sequence SL1 of the line is transmitted as an address word CA1. The address word CA1 has a length which is equal to the sum of the number AW and a whole numbered multiple of the sum of the numbers AW and AS and, for example, is equal to 10. In the scanning line represented in the row $a1$, a first white sequence AL1 consisting of 14 white surface elements is followed by the first black surface element, and thus the latter's address 15 is represented as dual number 0000001111 by the address word CA1. Then, the sequence lengths of the following white and black sequences WL $(n-1)$ to SL $(n)$ are represented in a similar fashion as in FIG. 1. After a given number of binary characters, which number is equal to a whole numbered multiple of the sum of the numbers AW and AS, another address word CA2 is transmitted. Because of the selected numbers AW and AS, in most cases a code word CS will have ended directly before the beginning of an address word. In this case, as represented in FIG. 2 in rows $a2$ and $b2$, the address, e.g. 223, of the first surface element of the black sequence SL $(n)$ is transmitted by the address word CA2. Subsequently, the sequence length of the black sequence SL $(n)$ is transmitted by the code word CS $(n)$. The white sequence WL $(n)$ will not be represented. Similarly, the address of the next black sequence is transmitted when a code word CVW is interrupted by an address word. If, however, a code word CVS is interruped by an address word, the address of the last surface element already represented of this sequence is transmitted, and the part of this sequence which is not yet coded is transmitted together with this spot following the address word in the manner of an independent, black sequence. It is necessary to also include the addressed black surface element to prevent this sequence from possessing the length 0.

As soon as the last black sequence SL $(n)$ of the scanning line has been represented by a code word CS $(n)$, the next line synchronizing word LW2 is transmitted. This ensures that the last sequence of a scanning line is always black and during this coding process it is possible to dispense with the addition of a black spot at the end of the scanning line.

By virtue of the addressing of the first black sequence, and the omission of the last white sequence of a line, the compression factor is increased in comparison to the coding represented in FIG. 1, since in most cases, pages are provided with a white border on the left-hand side and on the right-hand side.

If a binary character is adulterated in the transmission of the code words, the effects of this fault continue only to the next address. At points of an original which are rich in detail and where fault paths have particularly noticeable effects, these faults are limited to a small zone. If long fault paths occur, these occur in an area of the original which exhibits little detail where they generally are least disturbing.

Figure 3:
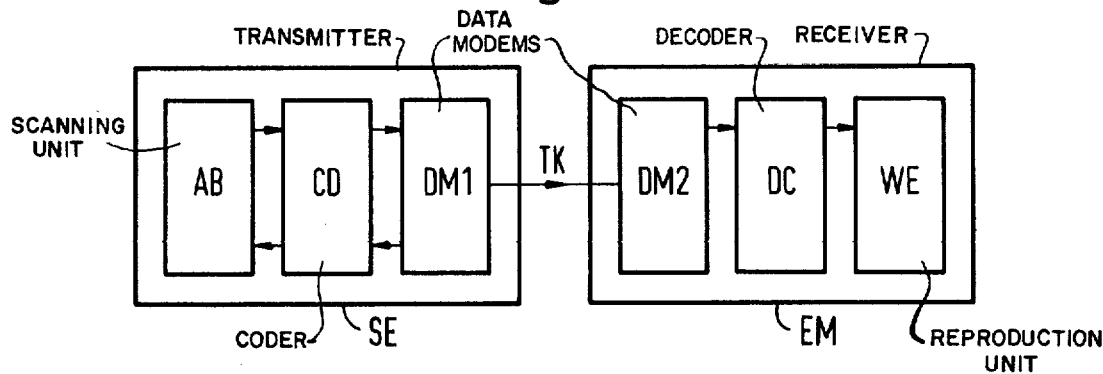
FIG. 3 is a block circuit diagram of an arrangement for facsimile transmission.

The arrangement for facsimile transmission represented in FIG. 3 consists of a transmitter SE and a receiver EM. The transmitter SE contains a scanning unit AB in which the original which is to be transmitted is scanned line-by-line. The white and black sequences are transmitted in the form of binary signals to a coder CD. The coder produces the code words assigned to the sequences which it feeds to a data modem DM1. From the data modem DM1 the code words are transmitted, e.g. via a telephone channel TK, to a further data modem DM2 in the receiver EM. The data modem DM2 is followed by a decoder DC which, from the transmitted code words, produces control signals for a reproduction unit WE in which the transmitted original is reproduced.

Figure 4:
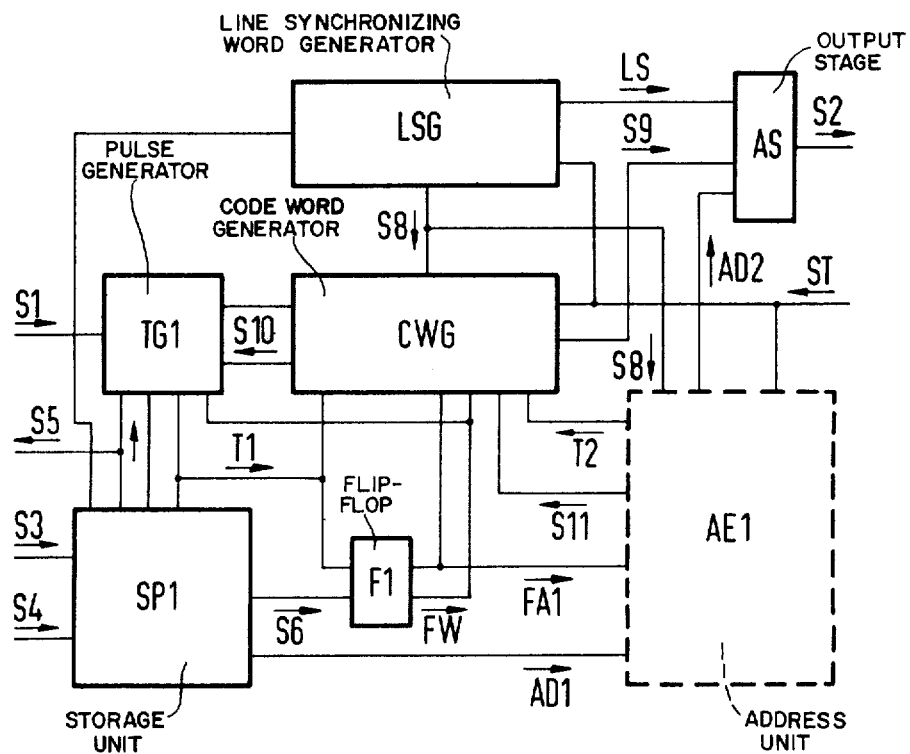
FIG. 4 is a block circuit diagram of a coder.

The coder CD illustrated in FIG. 4 is supplied with a start signal S1 which triggers the production of the line synchronizing word. Under the control of a transmitting pulse train ST emitted from the data modem DM1, the line synchronizing word is fed from a line synchronizing word generator LSG, via an output stage AS, as a signal S2 to the data modem DM1. Then, following the start signal S1, the scanning unit AB emits the binary signals S3 which represent the white and black sequences, and associated timing pulses S4 to a storage unit SP1. When the binary signals S3 assigned to a line have been transmitted in full, the storage unit SP1 emits a stop signal S5 to the scanning unit AB. This stop signal S5 simultaneously releases a pulse generator TG1. With the timing pulses T1 emitted from the pulse generator TG1, the binary values stored in the storage unit SP1 of the binary signals S3 are read out. As soon as a color change occurs during the read-out of the contents, a flip-flop F1 is triggered, and, in the event of a change in the color signal FA1, the pulse generator TG1 is blocked by a signal FW. A code word generator CWG then produces a code word CW1 which is associated with the length of the first white sequence WL1 which has just been read out. After the last binary character of the line synchronizing word, the code word CW1 is transmitted by the transmitting pulse train, ST via the output stage AS, to the data modem DM1. Simultaneously, the black sequence SL1 is coded, and, following the transmission of the code word CW1, is itself transmitted, etc.

When the content of the storage unit SP1, which is assigned to one line, has been read out, the pulse generator TG1 is again blocked and the binary signals S3 associated with the sequences of the next line are transmitted from the scanning unit AB to the storage unit SP1. After the transmission of the next line synchronizing word, the code words of the next line are produced in a similar fashion.

If an address unit AE1 is used to gate in address words, following each line synchronizing word and, in each case, following a given number of transmitted binary characters, the addresses of the particular next black sequence are transmitted via the output stage AS.

Further details of the coder CD will be described together with the circuit diagrams represented in FIGS. 5 to 8.

Figure 5:
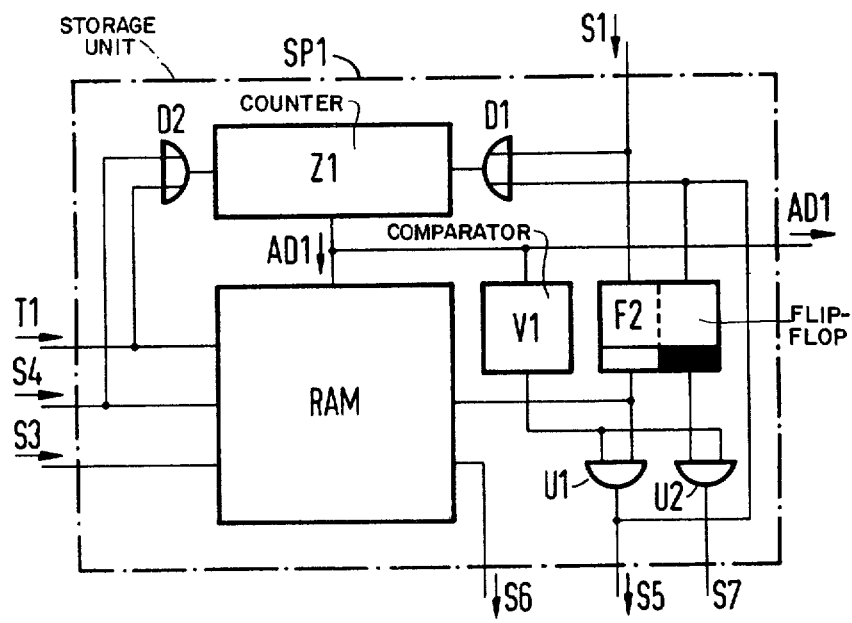
FIG. 5 is a circuit diagram of a storage unit.

In the storage unit SP1 represented in FIG. 5, the start signal S1 is conducted to a flip-flop F2 and via and OR gate D1 to a counter Z1. The start signal S1 resets the flip-flop F2 and the counter Z1. The signal at the output of the flip-flop F2 prepares a write-in/read-out store RAM consisting of a commercially available integrated module for the write in of the binary values of the binary signals S3. Then the binary signals S3 and the associated timing pulses S4 are emitted from the scanning unit AB. These timing pulses S4 are fed both to the store RAM as a write-in command and also, via an OR gate D2, to the counter Z1. Each timing pulse S4 advances the counter Z1 which indicates the address of that cell in which the corresponding binary value of the binary signal S3 is written. When the line is fully input, a comparator V1 which compares the contents of the counter Z1 with the value assigned to the length of a line, emits the stop signal S5 via an AND gate U1. The stop signal S5 resets the flip-flop F2 and the counter Z1 again. The signal at the output of the flip-flop F2 then prepares the store RAM for read-out.

With the aid of the timing pulses T1, the contents of the store RAM is read out for the production of the code words. The signal S6 at the output of the store RAM is conducted to the flip-flop F1 which is triggered with every color change. When all the binary values in a line have been read out, via an AND gate the comparator V1 emits a signal S7 which blocks the pulsing generator TG1 and restarts the scanning unit AB.

When the signal S4 occurs before the last binary character of the line synchronizing word has been emitted, it causes a renewed production of a line synchronizing word as, in this case, the line consists only of one single white sequence.

Figure 6:
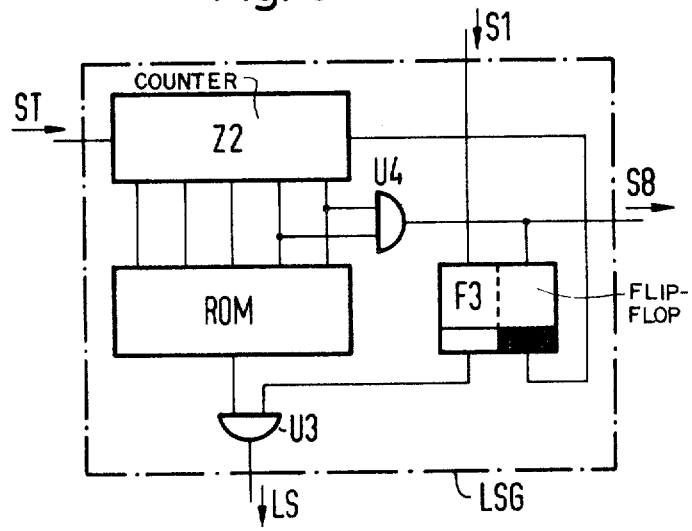
FIG. 6 is a circuit diagram of a line synchronizing word generator.

The synchronizing word generator LSG represented in FIG. 6 is also supplied with the start signal S1. The start signal S1 serves to set a flip-flop F3 at the beginning of each line. With each transmitting pulse train a counter Z2 is caused to count upwards and its content serves as address for a fixed word store ROM. At the output of the fixed word store ROM, the line synchronizing word is emitted in serial fashion as signal LS via an AND gate U3. This signal consists, for example of a preagreed succession of 24 binary characters. An AND gate U4 checks whether the two highest-value positions of the counter Z2 assume the binary value 1 and whether the count 24 has been reached. If this is so, the flip-flop F3 and the counter Z2 are reset. At the same time, a signal S8 is emitted in order to indicate the end of the line synchronizing word.

Figure 7:
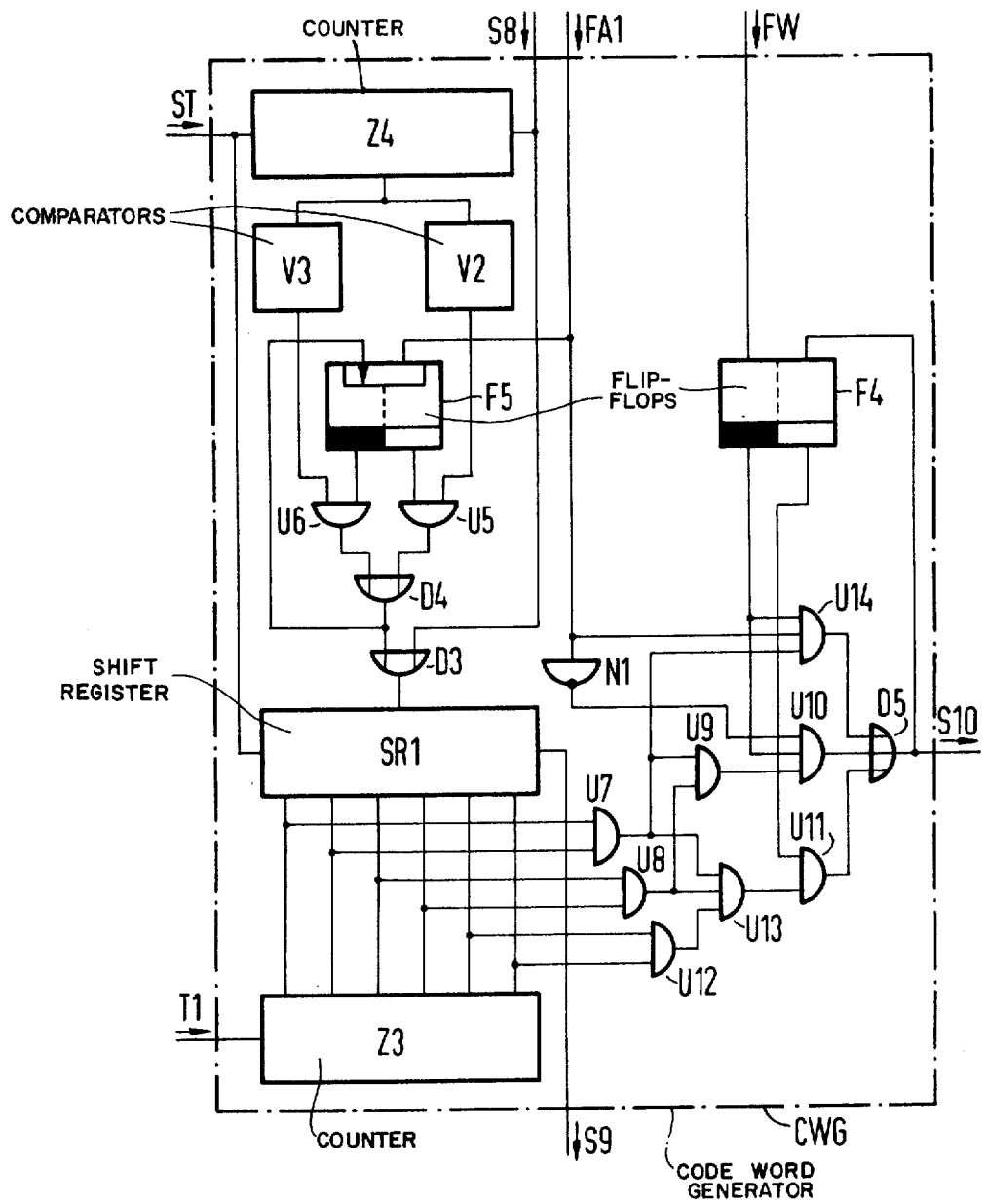
FIG. 7 is a circuit diagram of a code word generator.

The code word generator CWG shown in FIG. 7 is supplied with the timing pulses T1 the number of which corresponds to the relevant sequence length. The timing pulses T1 are counted in a counter Z3. After the first timing pulse the counter assumes the count 0. When, as in FIG. 1, the first white sequence WL1 has a sequence length 14, at the end of the sequence the counter Z3 possesses a count 13. At the beginning of the first black sequence SL1 the pulse generator TG1 is blocked and the signal FW--which indicates every change in color --resets a flip-flop F4. The signal FA1 which indicates the color of the sequence which is currently to be coded still possesses the binary value 0. After the end of the line synchronizing word, the modulo-6 counter Z4 is reset with the signal S8. At the same time, the count 13 is loaded into a shift register SR1 via an OR gate D3. As the counter Z4 is reset, a comparator V2, which serves to check whether the count 0 has been reached, emits a signal via an AND gate U5 and an OR gate D4 to a flip-flop F5 which the signal resets. Subsequently, the transmitting pulse train ST moves the code word CW1 out of the shift register SR and transmits it as a signal S9 to the output stage AS, while the pulse generator TG1 is simultaneously released. The timing pulses assigned to the next black sequence SL1 with the sequence length 3 are recounted again, and the counter Z3 then contains the number 2. After this sequence the signal FW reoccurs and the signal FA1 has the binary value 1 since a black sequence is coded. When the counter Z4 has counted four transmitting pulse trains ST, via an AND gate U6 and the OR gates D4 and D3, a comparator V3, on the one hand, emits a signal to the shift register SR1 in order to receive the contents of the counter Z3 and, on the other hand, emits a signal to the flip-flop F5 by which the latter is set.

The contents of the shift register SR1 is again emitted as the signal S9. Meanwhile, the length of the next white sequence WL2 is determined in the counter Z3. As this sequence has the sequence length 20, the binary value 1 is emitted at the output of the AND gates U7 to U9 when the counter Z3 has reached the count 15. As the binary value 1 is also present at the output of an inverter I1, via an OR gate D5, the AND gate U10 emits a signal S10 which indicates an overflow of the code word CW2. This signal brings about a blockage of the pulse generator TG1 until the code word CW2 has been determined.

The signal S10 sets th flip-flop F4 and releases an AND gate U11. After two transmitting pulse trains ST, the counter Z4 again reaches the count 0 and the contents of the counter Z3 is transferred back into the shift register SR1, and the flip-flop F5 is reset. Then the code word CW2 is emitted and the remainder of the white sequence WL2 is coded. When the counter Z4 has again reached the value 4, the code word CVW2, which contains the remainder of the white sequence WL2, is written into the shift register SR1. As the color of the sequence has not changed at this time, the flip-flop F5 is not triggered. After two transmitting pulse trains ST, the counter Z4 again reaches the count 0, but the signal emitted from the comparator V2 is block by the AND gate U5. After another four transmitting pulse trains ST, the counter Z4 again reaches the count 4 and the code word CS2 assigned to the next black sequence SL2 is input into the shift register SR1. If the additional code word has not been sufficient to code the white sequence, a further signal S11 would have been produced via the AND gates U11 to U13 and would have initiated the production of a further code word. The black sequence SL2 is coded in a similar fashion to the white sequence WL2. In this case an overflow is recognized by the AND gate U14 and th flip-flop F5 remains set so that following the code word CS2 the additional code word CVS2 can be taken up at the count 0.

If the address unit AE1 is provided, the counter Z4 is reset, not after the line synchronizing word LW1, but only after the transmission of the address word CA1. Also, in this case the timing pulses T1 are only emitted from the pulse generator TG1 when black sequences are coded, and otherwise from a pulse generator TG2 in the address unit AE1.

After the end of the line synchronizing word LW1 the address unit AE1 represented in FIG. 8 is supplied with the signal S8. This signal S8 sets a flip-flop F6 and writes the instantaneous address AD1 contained in the counter Z1 of the storage unit SP1 into the shift register SR2. Then, with the aid of the transmitting pulse trains ST, the address is read out of the shift register SR2 in serial fashion and as a signal AD2, which is represented by the address word CA1, is transmitted to the output stage AS. A counter Z5 counts the transmitting pulse trains and after ten transmitting pulse trains ST, when the address has been emitted in full, emits a signal S11 which resets the flip-flop F6 and blocks the further emission of transmitting pulse trains ST by a AND gate U15. At the same time, the production of the code words is started. With the signal S8 a counter Z6 has been simultaneously reset which counts the transmitting pulse trains ST between two gated-in addresses. When, for example, the address words are to be gated in at intervals of 102 binary characters, a comparator V4 which compares the count with 102, emits a signal, via an ANd gate D6, which signal produces the gating-in of an address word in the same way as the signal S8. During the gating in of the address word the production of the code words is blocked.

The address unit AE1 also contains another counter Z7 which counts the length of the white sequences, since these must be established before the production of the address words. If a white sequence is coded, its length is stored in the counter Z7. At the beginning of the following black sequence a pulse generator TG2 is released which emits timing pulses T2 which are fed to the code word generator CWG in place of the timing pulses T1. The counter Z7 is caused to count downwards with the timing pulses T2 until it has reached the count 0. When this occurs, it again blocks the pulse generator TG2 and supplies the code word generator CWG with the timing pulses T1 in order to code the next black sequence.

The decoder DC represented in FIG. 9 is supplied with the transmitted signals S12 via the data modem DM2. A detector LSD for the line synchronizing word checks whether the sequence of binary characters is identical with the agreed line synchronizing word. If there is agreement, a code word decoder CWD is released for the binary characters which follow the line synchronizing word. The code words are decoded and the signals assigned to the black and white sequences are stored in a storage unit SP2. When a sequence of a line has been decoded, a signal S13 and associated timing pulses T3 are emitted to the reproduction unit WE. If a coding is used exhibiting additional gating in of address words, another address unit AE2 is provided which recognizes the occurrence of an address word and then loads this address word, as an address, into an address counter of the storage unit SP2. This address serves to address the next black sequence in the storage unit SP2.

Further details of the decoder DC will be described together with the circuit diagrams represented in FIGS. 10 to 12.

Figure 10:
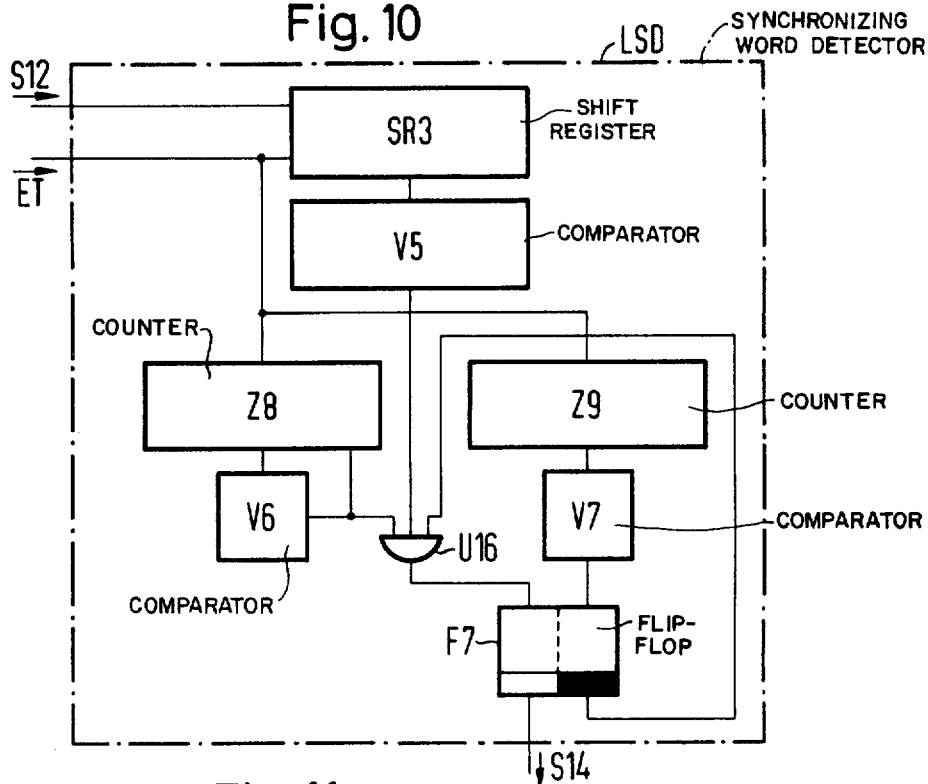
FIG. 10 is a circuit diagram of a line synchronizing word detector.

In the synchronizing word detector LSD represented in FIG. 10 the signal S12 emitted from the data modem DM2 is input into a shift register SR3 with an associated receiver pulse train ET. The parallel outputs of the shift register SR2 are connected to a comparator V5 which compares the relevant content of the shift register with the succession of binary characters which has been agreed upon as a line synchronizing word. A modulo-6 counter constructed from a counter Z8 and a comparator V6 emits a pulse which is assigned to the pulse train times of the code words after six receiver pulse trains ET at the count 0. A counter Z9 counts the number of the binary characters of the line synchronizing word. When the counter Z9 has reached the count 24, it resets a flip-flop F7. The signal at the inverted output of the flip-flop F7 resets the counter Z9 and releases an AND gate U16. If the comparator V5 establishes identity, and the comparator V6 emits a pulse, the line synchronizing word is recognized and the flip-flop F7 is set. At the output of the flip-flop F6 a signal S14 is emitted which is conducted to the pulse generator TG3 and to the address unit AE2.

Figure 11:
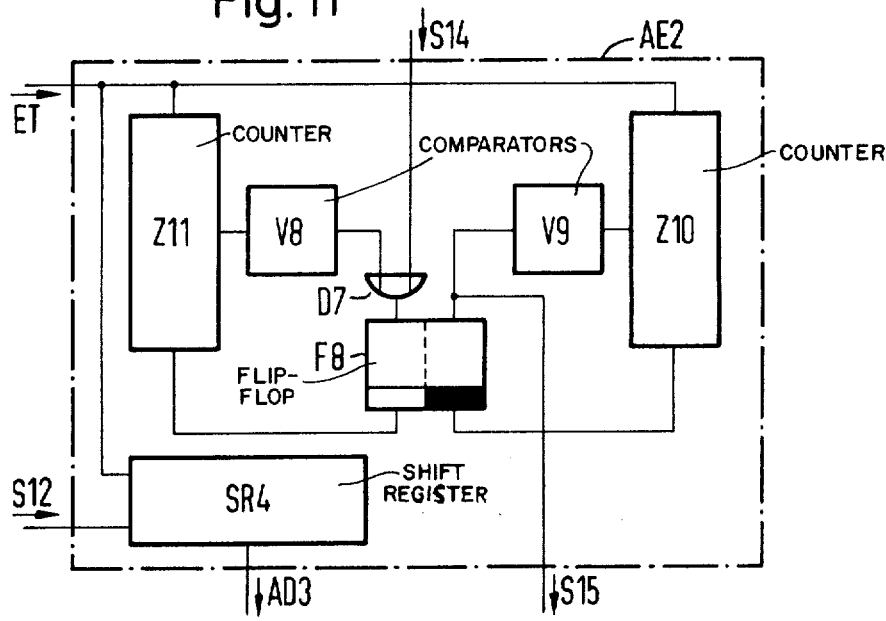
FIG. 11 is a circuit diagram of a second address unit.

The address unit AE2 represented in FIG. 11 is likewise supplied with the signal S11. The binary values of this signal are input into a shift register SR4 with the aid of the receiver pulse train ET. When the line synchronizing word has been found, via an OR gate D7 the signal S14 sets a flip-flop F8 and a counter Z10 is released. As the address word CA1 consists of ten binary characters, a comparator V9 emits a signal S15 when the count of 10 is reached. This signal S15 is emitted to the storage unit SP2 and brings about a parallel write in of the contents of the shift register SR4, as an address, into the counter for the address of the storage positions in the storage unit SP2. The storage unit SP2 is of similar construction to the storage unit SP1 and likewise contains a write-in/read-out store RAM, a counter and switching elements for controlling the read-out and write-in operations.

The signal S15 also resets the flip-flop F8 and the counter Z10. As the address words are inserted between the code words at intervals of, e.g. 102 binary characters, after an interval of 102 binary characters the content of the shift register SR4 must be written into the counter of the storage unit SP2. A counter Z11, which is supplied with the receiver pulse trains ET, is followed by a comparator V8 which, at the count 102, emits, via the OR gate D7, a signal which sets the flip-flop F8. Similarly, as after the signal S14, the counter Z11 is released and ten binary characters are again counted, and with the signal S15 the address is again transferred as the signal AD3 into the storage unit SP2. When the flip-flop F8 is set, the counter Z11 is reset again.

Figure 12:
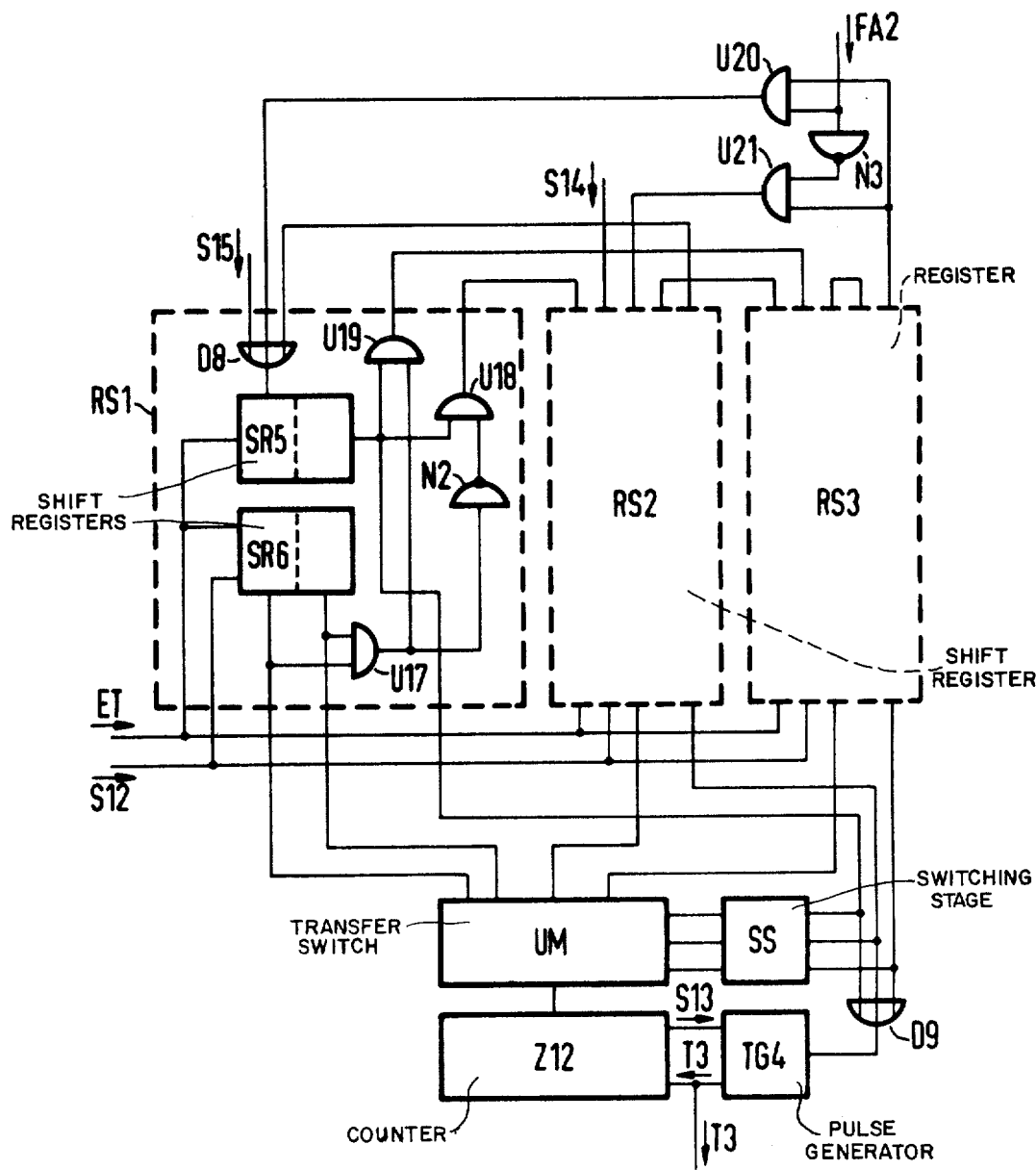
FIG. 12 is a circuit diagram of a code word decoder.

The code word decoder CWD represented in FIG. 12 contains three registers RS1 to RS3 of similar construction. The shift register RS1 contains two two-stage shift registers SR5 and SR6, an OR gate D8, three AND gates U17 to U19 and an inverter N2. The shift registers RS2 and RS3 differ from the shift register RS1 merely in that they possess four-stage and six-stage shift registers, respectively, instead of the two-stage shift registers.

When the address unit AE2 is used, the first code word to occur after the line synchronizing word and the address word CA1 is the code word CS1 for the black sequence SL1. The first stage of the shift register SR5 is set with the signal S15 and the occurrence of the first receiver pulse train ET. At the same time the code word CS1 is written into the first stage of the shift register SR6. With the next receiver pulse train ET the code word CS1 is transferred in full into the shift register SR6 and the binary value 1 in the shift register SR5 is displaced into the second stage. As the binary value 1 now appears at the output of the shift register SR5, via a switching stage SS, a transfer switch UM is operated in such manner that the parallel outputs of the shift register SR6 are connected to the parallel inputs of a counter Z12. At the same time a pulse is produced in a pulse generator TG4 which serves to transfer the contents of the shift register SR6 into the counter Z12. Then, further pulses T3 are emitted which cause the counter Z12 to count downwards until the count of −1 is reached. Then the pulse generator TG4 is blocked with a signal S13. While the counter Z12 is counting downwards, the pulses T3 are also conducted to the storage unit SP2.

As the code word CS1 does not consist of the binary characters 11 via the AND gate U17 and the inverter N2 the AND gate U18 is released which in a similar fashion sets the first stage of the first shift register in the shift register RS2. Then the code word CW2 is input into the second shift register and then transmitted to the counter Z12. Then the counter Z12 is caused to count downwards again.

Since the code word CW2 consist only of binary 1's, an AND gate in the shift register RS2 corresponding to the AND gate U19 is released and the first stage of the shift register in the register RS3 is set in order to decode the code word CVW2. The code word CVW2 is input into the second shift register of the register RS3 and is then transmitted to the counter Z12.

Then the code word CS2 is decoded. As this is a black sequence, the color signal FA2 has the binary value 1. Therefore, the OR gate D8 is again operated via the AND gate U20.

As following the code word CVS2, a white sequence is again decoded, the color signal FA2 which has been inverted by the inverter N3 releases the AND gate U21 and the first position of the shift register in the register stage RS2 is set. On the reception of the next line synchronizing word, the contents of the store in the storage unit SP2 is transferred to the reproduction unit WE and the store is reset.

If the address unit AE2 is not provided, after the end of the line synchronizing word, with the signal S14, the register stage RS2 is firstly operated instead of the register stage RS1, as in this case the decoding of a white sequence is started after the line synchronizing word.

Although we have described our invention by reference to a particular illustrative embodiment thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. In a process for facsimile coding in which items of information contained on a two-color original are scanned line-by-line for the purpose of transmission, in which the lengths of sequences of a first of the colors are represented by first code words consisting of a given first number of binary characters, and the lengths of sequences of the second color are represented by second code words consisting of a second number of binary characters, and in which the first and second code words are followed by third code words when the binary characters are not sufficient for coding the corresponding sequences, the improvement therein comprising the step of:
   generating a number of binary characters for the third code words which is equal to the sum of the number of binary characters of the first code words and the number of binary characters of the second code words.

2. The improved process of claim 1, comprising the step of:
   forming a line synchronizing word at the beginning of a line having a number of binary characters which is a whole number multiple of the sum of the first and second numbers.

3. The improved process of claim 2, comprising the steps of:
   selecting the background color of the original as the first color; and
   selecting the color of the items of information to be transmitted as the second color.

4. The improved process of claim 2, comprising the steps of:
   selecting white as the background color and as the first color; and
   selecting black as the second color and as the color of the items of information to be transmitted.

5. The improved process of claim 2, comprising the step of:
   producing only the line synchronizing word for those lines which consist of only one color.

6. The improved process of claim 2, comprising the steps of:
   transmitting a coded simulated spot of the first color at the beginning of a line;
   transmitting a coded simulated spot of the second color at the end of a line;
   receiving the entire transmitted signal; and
   inhibiting reproduction of the simulated spots.

7. The improved process of claim 2, comprising the step of:
   transmitting an address word to indicate the address of the next sequence after a given number of binary characters which is equal to a whole-number multiple of the sum of the first and second numbers.

8. The improved process of claim 7, wherein said address word indicates the address of the next particular sequence of the second color.

9. The improved process of claim 8, comprising the step of:
transmitting the address of the first sequence of the second color after each line synchronizing word.

10. The improved process of claim 9, comprising the step of:
forming each address of a number of binary characters equal to the sum of the first number and a whole number multiple of the sum of the first and second numbers.

11. The improved process of claim 10, comprising the step of:
transmitting the particular next line synchronizing word after the last sequence of the second color of a line.

12. An apparatus for facsimile coding in which items of information contained on a two-color original are scanned line-by-line for the purpose of transmission, in which the lengths of sequences of a first of the colors are represented by first code words consisting of a given first number of binary characters, and the lengths of sequences of the second color are represented by second code words consisting of a second number of binary characters, and in which the first and second code words are followed by third code words when the binary characters are not sufficient for coding the corresponding sequences, the apparatus comprising:
a transmitter including a coder for producing code words, said coder comprising a code word generator including a counter for establishing the sequence lengths to be coded, a shift register connected to said counter for receiving the contents thereof at stipulated times in each case after a number of emitted binary characters which is equal to the number of binary characters in the particular transmitted code words, and a transmission unit connected to receive the code words from said shift register; and
a receiver including a decoder comprising a code word decoder including first and second registers for receiving said first and second code words which are assigned to said first and second colors, respectively, a third register for receiving said third code words, and a transfer switch operable to read out said code words from said first, second, and third registers.

13. The apparatus of claim 12, comprising a clock pulse generator for generating a train of clock pulses, and wherein said code word generator further comprises an additional counter connected to said clock pulse generator for receiving the clock pulse train and for counting the binary characters of the code words under the control of the pulse train, and comprising first and second comparators connected between said additional counter and said shift register and each of which is operable to produce a signal to transfer the contents of said additional counter into said shift register when a number of binary characters assigned to the particular transmitted code word has been emitted.

14. The apparatus of claim 12, wherein each register of said receiver includes a first shift register connected to receive words for storage and a second shift register for storage of control signals and including an output which provides a first binary value when the corresponding code word is stored in full in said first shift register.

* * * * *